March 1, 1938.　　A P. FERGUESON　　2,109,664
WHEEL COVER AND LOCK MECHANISM
Filed July 2, 1936
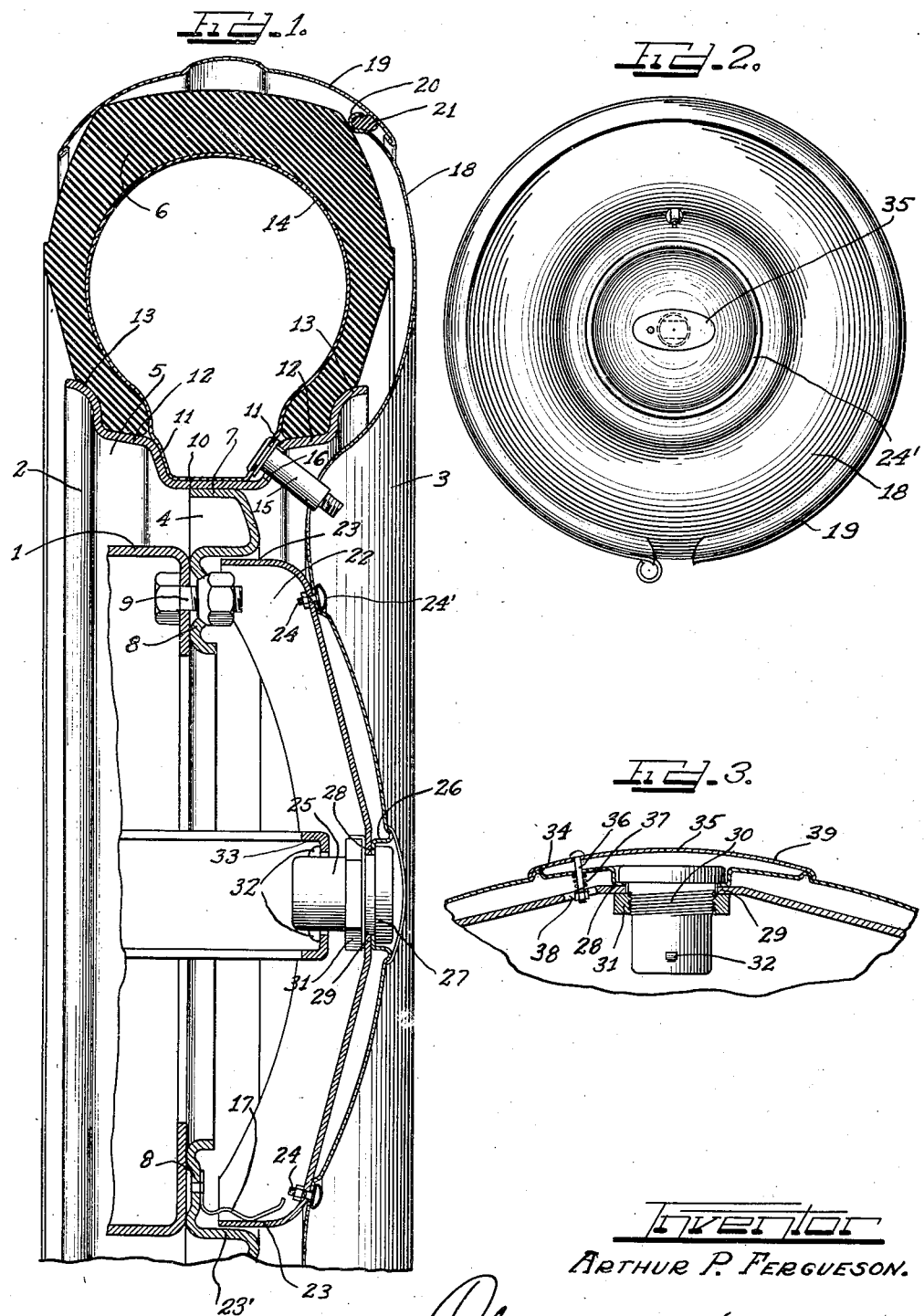
Inventor
ARTHUR P. FERGUESON.
by Charles M. Fields Attys.

Patented Mar. 1, 1938

2,109,664

UNITED STATES PATENT OFFICE 2,109,664

WHEEL COVER AND LOCK MECHANISM

Arthur P. Fergueson, Detroit, Mich., assignor, by mesne assignments, to Houdaille-Hershey Corporation, Detroit, Mich., a corporation of Michigan Application July 2, 1936, Serial No. 88,539

6 Claims. (Cl. 150—54)

This invention relates to a spare wheel cover assembly, and more particularly to the mounting and locking means of a spare wheel cover assembly.

Spare wheels have been assembled on vehicles in the past in a wide variety of manners. It is considered important in the design of such assemblies, that the outward appearance be pleasing to the eye, that some means be provided to render the assembly substantially theftproof, and that the entire assembly be economical to manufacture and rugged and reliable in use. Hence, it is an object of my invention to provide a novel form of assembly which fulfills the above requisites of a good design.

It is a further object of my invention to provide a novel form of spare wheel cover and lock mechanism. A still further object of my invention is to provide a novel form of spare wheel cover and lock mechanism including a novel dust excluding cap mounting.

The novel features which I believe to be characteristic of my invention are set forth with particularity in the appended claims. My invention, however, both as to its organization and manner of construction, together with further objects and advantages thereof, may best be understood by reference to the following description taken in connection with the accompanying drawing in which:

Figure 1 is a cross sectional elevational view illustrating a portion of one embodiment of my invention;

Figure 2 is a side view in elevation of the embodiment of my invention illustrated in Figure 1; and Figure 3 is a view partly in cross section of the lock mechanism and dust excluding cap which form part of the embodiment of my invention illustrated in Figure 1.

Referring now to Figure 1, the wheel cover assembly illustrated comprises a spare wheel support 1, such as that which is usually provided on motor vehicles for carrying an extra or spare wheel, a wheel 2 mounted on support 1, and a two-piece ornamental spare wheel cover 3. Although wheel 2 is shown as being a drop center rim disk wheel which includes a body part 4, a rim part 5, and a tire 6, it is to be understood that the invention is not limited to a wheel of any particular type or precise configuration as will presently be pointed out. Body part 4 of wheel 2 is apertured at the center and includes a laterally extending flange 7 at its outer periphery and a fastening flange 8 adjacent the center aperture.

The fastening flange 8 has an annular series of apertures through which a plurality of fastening bolts 9 carried by support 1 are inserted to firmly secure wheel 2 to the support. Similar bolts carried by the brake drum or axle of the vehicle (not shown) serve to secure the wheel in an operative position when the spare wheel has been substituted for one of the regular wheels. As is known to the art, it is not usually necessary to use as many bolts to mount spare wheel 2 on spare wheel support 1 as is used to mount a wheel on the axle of a vehicle, and hence it will be understood that the support 1 may be provided with a fewer number of bolts 9 than there are apertures in fastening flange 8.

Rim 5 is of the drop center type and includes a base flange 10, opposite side flanges 11, opposite intermediate flanges 12, and opposite edge portions 13. Base flange 10 of rim 5 is secured to laterally extending flange 7 of body part 4 in any suitable manner, such as by rivets or by welding (not shown).

Tire 6 is seated on intermediate flanges 5 in the usual manner. An inner tube 14 is disposed within tire 6 and includes a valve part 15 which extends through a suitable aperture 16 in outer side flange 11.

A plurality of hub cap retaining spring elements 17 (only one of which is shown for purposes of clarity) are secured to fastening flange 8 of body part 4 in the manner shown in the drawing. These spring elements not only serve to secure a hub cap (not shown) in place when the wheel is mounted on the vehicle axle, but also serve to support ornamental cover member 3 in its desired position when the wheel is mounted on spare wheel support 1, as will presently be explained.

The two-piece ornamental spare wheel cover 3 includes a side plate 18 and a resilient split ring 19. Side plate 18 and ring 19 are composed of sheet material, preferably metal, and they may assume any desired configuration which is pleasing to the eye and which will enhance the general beauty of the vehicle upon which the wheel is mounted. In order to eliminate noise in the cover assembly caused by metal to metal contact, the outer marginal edge 20 of side plate 18 is outwardly curled to carry and secure a cushioning bead 21 upon which ring 19 rests. Bead 21 is composed of soft rubber or other material having similar cushioning properties.

Since side plate 18 is preferably made of relatively thin material to reduce manufacturing costs, a stiffening drum-like member 22 is secured on the inner side of plate 18 as shown in the drawing. Member 22 has a laterally inwardly extending flange 23 which is adapted to cooperate with shoulder 23' of body part 4 and spring elements 17 to support side plate 18 in its desired position.

Side plate 18 is secured to member 22 near the outer edge of the latter by means of a plurality of bolts 24. Since a bolt head is not ordinarily pleasing to the eye, an ornamental bead 24' is disposed on the outer side surface of plate 18 in such a manner as to hide the bolt heads. Bead 24' may conveniently be secured to plate 18 by the bolts themselves by underturning the edge of the bead as shown.

Side plate 18 and member 22 are centrally apertured in order to mount a lock mechanism 25 therein. The central portion 26 of side plate 18 adjacent the centrally disposed aperture of the plate is formed to provide a recess for head 27 of lock mechanism 26. Upon close inspection of the drawing, it will be seen that the inner marginal edge 28 of plate 18 lies in intimate contact with the inner marginal edge 29 of member 22.

Lock mechanism 25 is illustrated as being of the cylindrical type and is externally threaded at 30 (as shown in Figure 3) to receive a nut 31. After lock mechanism 25 has been inserted in the central aperture of member 22 and side plate 18, and nut 31 is screwed tightly against the inner side of member 22, it will be seen that lock mechanism 25 has not only been secured in its desired position, but also side plate 18 is firmly secured to drum-like member 22 at that point.

Lock mechanism 25 includes a plurality of radially movable locking fingers 32 which are adapted to coact when in an extended position with a central locking member 33 of support 21 to lock cover 3 and spare wheel 2 to the vehicle. Locking member 33 may be a part of the vehicle (not shown), or a part of spare wheel support 1, and may assume any of a wide variety of forms without departing from the spirit and scope of this invention. The lock mechanism is adapted to be operated upon the insertion of a proper key into head 27.

Side plate 18 has an oval-shaped, raised portion or shoulder 34 in proximity to its central recess over which a dust excluding cap 35 is mounted, as may be seen best in Figures 2 and 3 of the drawing. Cap 35 has an inturned edge which fits snugly over shoulder 34, and is held in position by a dust cap retaining pin 36 and a biasing spring 37. Drum-like member 22 is apertured as at 38 at a point opposite pin 36, which permits pin 36 to extend partially therein and which permits ready access to the pin and to biasing spring 37. When access to head 27 of lock mechanism 25 is desired, end 39 of dust cap 35 is raised against the action of biasing spring 37 and the cap is then rotated about pin 36. To return cap 35 to its dust excluding position, end 39 of cap 35 is again raised and the cap rotated back to its original position.

From the above description it will be seen that I have provided a novel cover and lock mechanism for spare wheels which is simple and economical to construct and which may be quickly placed in its covering and locking position by a single axial movement.

While I have shown a particular embodiment of my invention, it will of course be understood that I do not wish to be limited thereto, since many modifications may be made, and I, therefore, contemplate by the appended claims to cover all such modifications as fall within the true spirit and scope of my invention.

I claim as my invention:

1. In a spare wheel cover assembly including a wheel including a depressed hub, a wheel support, and a wheel cover, the combination with said cover of a stiffening member therefor disposed in spaced relation over a portion of an inner face of said cover having a portion telescoping said hub to center the cover, and a lock mechanism integrally and centrally mounted on said member and said cover adapted to snap into locking engagement with said wheel support as said cover is moved into its covering position on said wheel.

2. In a spare wheel cover assembly including a wheel including a depressed hub, a wheel support, and a wheel cover, the combination with said cover of a stiffening member therefor disposed in spaced relation over a portion of an inner face of said cover having a portion telescoping said hub to center the cover, and a lock mechanism integrally and centrally mounted on said member and said cover adapted to snap into locking engagement with said wheel support as said cover is moved into its covering position on said wheel, said lock mechanism having means for securing said member to said cover.

3. In a spare wheel cover assembly including a wheel, a wheel support, and a wheel cover having a small centrally disposed aperture, the combination with said cover of a stiffening member therefor disposed in spaced relation over a portion of an inner face of said cover, said member having an aperture substantially coincident with the aperture of said cover, and a lock mechanism integrally and centrally mounted on said member and said cover adapted to snap into locking engagement with said wheel support as said cover is moved into its covering position on said wheel, said lock mechanism extending through said apertures and having an enlarged shoulder abutting the outer face of said cover, and a lock mechanism securing element removably secured to said mechanism abutting the inner face of said stiffening member, whereby said stiffening member is firmly secured to said cover at that point.

4. In a spare wheel cover assembly including a wheel support, a wheel mounted on said support, and a wheel cover having an ornamental side plate disposed over an outer side surface of said wheel, the combination with said cover of a drum-like member mounted on the interior face of said side plate and arranged to extend into cover supporting engagement with said wheel, and a lock mechanism centrally mounted on and secured to said drum-like member adapted to snap into locking engagement with said wheel support as said cover is moved into its covering position on said wheel.

5. In a spare wheel cover assembly including a wheel support, a wheel mounted on said support, and a wheel cover having an ornamental side plate disposed over an outer side surface of said wheel, the combination with said cover of a drum-like member mounted on the interior face of said side plate and arranged to extend into cover supporting engagement with said wheel, and a lock mechanism centrally mounted on and secured to said drum-like member adapted to lock said cover to said wheel support, said side plate being recessed in proximity to said locking mechanism to provide ready access to said lock mechanism.

6. In a spare wheel cover assembly including a wheel support, a wheel mounted on said support, said wheel having an intermediate inwardly facing shoulder, and a wheel cover including an ornamental side plate adapted for disposition over an outer side surface of said wheel, the combination with said cover of a drum-like member centrally apertured and mounted on the interior face of said side plate to slide into cover supporting engagement with said shoulder, said member lying in close proximity to said cover but spaced therefrom throughout the portion of said member between said member's inner and outer marginal edges, said side plate having a central aperture substantially the same size as the aperture of said drum-like member and a central recess slightly larger than the aperture of said member, the inner marginal edge of said member being disposed in intimate contact with said recessed portion of said cover, and a lock mechanism secured in said apertures and adapted to snap into locking engagement with said wheel support as said cover is moved into its covering position on said wheel.

ARTHUR P. FERGUESON.